United States Patent
Blomberg

[15] 3,656,972
[45] Apr. 18, 1972

[54] WHIP TOPPING
[72] Inventor: Erwin L. Blomberg, Minneapolis, Minn.
[73] Assignee: General Mills, Inc.
[22] Filed: Mar. 23, 1970
[21] Appl. No.: 22,084

[52] U.S. Cl. ............................................................99/139
[51] Int. Cl. ......................................A23g 3/00, A23l 1/14
[58] Field of Search..................................................99/139

[56] References Cited

UNITED STATES PATENTS 3,098,748  7/1963  Noznick et al........................99/139 X
3,434,848  3/1969  Katz........................................99/139
3,224,883  12/1965  Pader et al.............................99/139
2,913,342  11/1959  Cameron et al......................99/139 X
3,326,696  6/1967  Decnop..................................99/139

Primary Examiner—Raymond N. Jones
Assistant Examiner—J. M. Hunter
Attorney—Anthony A. Juettner and Gene O. Enockson

[57] ABSTRACT

A dry creamy topping composition which can be reconstituted and hand whipped to make a whipped creamy topping or frosting in less than a minute. The composition comprises a whipping component, sucrose and a pregelatinized starch.

3 Claims, No Drawings

WHIP TOPPING

This invention relates to a dry mix whippable composition useful as a topping or frosting. More particularly, it relates to a dry mix whippable composition which can be whipped by hand in a matter of a few seconds without the aid of mechanical mixers or mechanical devices such as the traditional egg beater.

Dry mix whip toppings and fluffy frostings are presently available in the market. These dry mix toppings, however, require vigorous whipping with a mechanical mixer after reconstitution to convert them into an aerated foam. The period of whipping is frequently as long as three to 5 minutes with an electric mixer.

The dry mix compositions of the present invention can be reconstituted and whipped into a foam using only slow beating by hand with a wire whip in as little as about 15 seconds. Depending upon the particular texture desired, the hand whipping may be for a period of about 15 seconds to one minute. The variation in texture or consistency which can be obtained by varying the amount of hand whipping and the amount of water added to a given weight of mix ranges from a light topping such as is used on strawberries to a light creme frosting suitable for use on a cake. As whipping times are prolonged, the foam becomes thicker. And, as the amount of water used is reduced, the foam becomes thicker. Generally, about 100 ml to 175 ml of water are used to 100 gms of the dry mix of this invention. However, if desired, some variation in these amounts can be made.

The dry mixes of the present invention comprise:

about 35 to 90 percent of a dry whipping component by weight of the total dry mix, said whipping component being a water soluble dry powder containing about 40 to 75 percent edible fat, about 0.0 to 10 percent mono- and diglycerides, about 0.5 to 15 percent whipping agent selected from the group consisting of glycerol lacto monopalmitate, glycerol lacto oleate and propylene glycol monostearates and mixtures thereof and about 1 to 15 percent protein, all amounts being by weight of the finished powder, about 2.0 to 55 percent sweetening agent by weight of the total dry mix, and about 8 to 20 percent pregelatinized starch by weight of the total dry mix, said pregelatinized starches having a granulation of from about 75 to 100 percent by weight through a 200 mesh U.S. Sieve.

The mixtures may also contain salt and flavorings to taste.

The whipping component is a spray dried composition including fat, glycerides, a whipping agent, a sweetener and a protein.

The edible fat in the whipping component is selected from edible fats having a range of melting points, e.g., from 72°F. to 130°F. and preferably about 75°F. to 100°F. The fat is present in amounts of about 40 to 75 percent in the whipping component.

The glycerides in the whipping component are composed of about 40 to 42 percent mono- and about 43 to 45 percent diglycerides, with the remainder triglycerides. The glycerides are not absolutely necessary to the whipping component and are present in amounts of about 0 to 10 percent by dry weight of the whipping component.

The principal whipping agents in the whipping component are glycerol lacto monopalmitate, propylene glycol monostearate and glycerol lacto oleate or mixtures of the agents. These agents are used in amounts of about 0.5 to 15 percent by weight of the whipping component.

Protein such as sodium caseinate, soy protein or nonfat milk solids or skim milk solids are present in amounts of about 1 to 15 percent by weight of the whipping component.

The above ingredients are put in a liquid mix having a range of 40 to 60 percent solids content. The liquid can be sweet skim milk or water. The mix is pasteurized at a temperature of about 140°F. to 165°F. for 25 to 30 minutes. It is then homogenized at a pressure of about 100 to 800 psi at about the pasteurization temperature. The spray drying is carried out in commercial apparatus having as large an orifice as possible to give a large particle size powder of about 75 to 200 microns.

The preparation of the whipping component is not a part of applicant's invention. Whipping components of this type are disclosed in U.S. Pat. No. 3,098,748 and are described as whippable in form about 2 to 4 minutes using an electric mixer. One particularly acceptable whipping component for the purposes of the present invention is manufactured by Beatrice Foods Co. and sold under the tradename "Wip-Treme 2585". This product contains 50 percent fat, 1.8 percent moisture and consists of hydrogenated vegetable shortening, corn syrup solids, mono- and diglycerides, glyceryl lacto esters of fatty acids, sodium caseinate and sodium citrate.

Sucrose used in dry mixes and the preferred sweetening agent in the mixes of the present invention is very finely ground. In many commercially available fine ground sugars, 3 percent to 4 percent starch is added to insure flowability during storage and use. This starch plays no part in the present invention. In the practice of the present invention sucrose acts only as a sweetening agent and the lower limit that can be used is determined only by that necessary to overcome the bland taste of the other components in the mix. Artificial sweeteners can be used instead of sucrose. Non-sucrose saccharides can also be used with some variations in the topping texture. Non-sucrose saccharides such as dextrose, corn syrup and dextrin have varying affinity for water and many form syrups which tend to produce heavy toppings.

The pregelatinized starch used in applicant's invention has an ideal granulation of 100 percent through a 200 mesh U.S. Sieve for the purposes of this invention. It has been found, however, that about 75 percent by weight through a 200 mesh U.S. Sieve can be tolerated. Best results have been obtained by using pregelatinized tapioca starch. It combines the advantages of good foaming performance and good taste performance.

One preferred combination of ingredients for producing versatile dry mixes, the texture of which can be easily varied from a very creamy fluffy topping to a thicker cream frosting, comprises about 45.0 to 60.0 percent whipping component by weight of the total dry mix, about 30.0 to 40.0 percent sucrose by weight of the total dry mix, and about 10.0 to 15.0 percent pregelatinized starch by weight of the total dry mix.

This mix can be reconstituted with about 100 to 175 ml of water per 100 grams of the dry mix.

Set out in Table 1 are the results obtained when different pregelatinized starches having a granulation of at least 75 percent by weight through a 200 mesh U.S. Sieve are used in the following combination:

| | % by Weight |
|---|---|
| Whipping Component, Wip-Treme 2585 (Beatrice Foods Co.) | 53.935 |
| Sucrose (Microse, manufactured by General Mills, Inc. Containing 4% starch to aid free flow) | 34.400 |
| Pregelatinized Starch | 11.600 |
| Salt (Flour grind) | 0.030 |
| Vanilla Flavor | 0.025 |
| Imitation Cream Flavor | 0.010 |

The procedure for reconstituting the whip composition consisted of adding the amount of water shown in Table 1 to 100 grams of the dry whip composition and beating slowly by hand with a wire whip for the time shown in Table 1.

TABLE 1

| Type of starch | Water used (ml.) | Whip time (sec.) | Results |
|---|---|---|---|
| Pregelatinized tapioca starch* | 175 | 15 | Good fluff, very creamy topping, texture, taste good. |
| Pregelatinized tapioca starch* | 175 | 30 | Good fluff, very creamy frosting, texture, taste good. |
| Pregelatinized tapioca starch (Redisol #4, A. E. Staley Co.) | 150 | 30-40 | Good fluff and creamy texture as a topping or frosting, teste good. |
| Pregelatinized tapioca starch (Redisol #4, A. E. Staley Co.) | 100 | 20 | Heavy fluff, frosting texture, good taste. |
| Pregelatizized tapioca starch (Redisol #88, A. E. Staley Co.) | 150 | 40 | Good fluff, texture good, like whip frosting, taste fair. |
| Pregelatizized tapioca starch (Hi Jel #90 A. E. Staley Co.) | 150 | 60 | Good fluff, texture good. |
| Pregelatinized potato starch (Redisol #313, A. E. Staley Co.) | 150 | 40-50 | Good fluff, good creamy texture, potato taste. |
| Pregelatinized waxy maize starch (Instant Clearjel, National Starch Co.) | 150 | 30 | Good fluff, good creamy texture, corn taste. |
| Pregelatinized waxy maize starch (Amzio, National Starch Co.) | 150 | 40 | Light foamy texture, wheat taste. |

*A pregelatinized tapioca starch made by making a starch slurry composed of about 70% water and 30% solids, and drum drying said starch slurry at a temperature of from about 250° F. to 270° F. for a period of about 15 seconds. The starch is then ground to an appropriate granulation.

Although the pregelatinized potato, waxy maize and wheat starches shown in Table 1 did in this instance impart a foreign flavor to the reconstituted whipped topping, these foreign flavors can be masked by appropriate artificial flavors.

Salt and flavorings can be added to the formulation. A salt level of about 0.01 to 0.04 percent by weight of the total dry whip topping composition has been found to give about the normal salt taste generally accepted by most people. More or less salt can, however, be added without affecting the accelerated whippability of the mix. The amount of flavoring that would be added depends upon the type of flavoring and the particular concentration of the flavoring used.

The embodiments of the invention in which an exclusive property or privilege is claimed are defined as follows:

1. A dry whip topping composition comprising:
   about 35.0 to 90.0 percent whipping component by weight of the total dry mix said whipping component being a water soluble dry powder comprising about 40 to 75 percent edible fat, about 0.0 to 10 percent mono- and diglycerides, about 0.5% to 15% whipping agent selected from the group consisting of glycerol lacto monopalmitate, glycerol lacto oleate and propylene glycol monostearate and mixtures thereof and about 1 to 15 percent protein, all amounts being by weight of the finished powder,
   about 2.0 to 55.0 percent sweetening agent by weight of the total dry whip topping mix, and
   about 8.0 to 20.0 percent pregelatinized starch by weight of the total dry whip topping mix, said pregelatinized starch having a granulation of from about 75 to 100 percent by weight through a 200 mesh U.S. Sieve.

2. The dry whip topping recited in claim 1 in which the pregelatinized starch is pregelatinized tapioca starch.

3. The dry whip topping composition as recited in claim 1 in which the whipping component is present in amounts of from about 45.0 to 60.0 by weight of the total dry mix, sucrose is present in amounts of from about 30.0 to 40.0 percent by weight of the total dry mix and the pregelatinized starch is present in amounts of about 10.0 to 15.0 percent by weight of the total dry mix.

* * * * *